(12) United States Patent
Dunn et al.

(10) Patent No.: US 9,394,896 B2
(45) Date of Patent: Jul. 19, 2016

(54) PRESSURE SENSING APPARATUS INCLUDING A PLURALITY OF ELECTROACTIVE POLYMER STRIPS

(71) Applicant: PARKER-HANNIFIN CORPORATION, Cleveland, OH (US)

(72) Inventors: Jason T. Dunn, Minneapolis, MN (US); Mario A. Calvo, Minneapolis, MN (US); Andrew Brenner, Pembroke, NH (US); Kenji A. Kingsford, Tucson, AZ (US)

(73) Assignee: Parker-Hannifin Corporation, Cleveland, OH (US)

( * ) Notice: Subject to any disclaimer, the term of this patent is extended or adjusted under 35 U.S.C. 154(b) by 76 days.

(21) Appl. No.: 14/346,826

(22) PCT Filed: Sep. 24, 2012

(86) PCT No.: PCT/US2012/056793
§ 371 (c)(1),
(2) Date: Mar. 24, 2014

(87) PCT Pub. No.: WO2013/044195
PCT Pub. Date: Mar. 28, 2013

(65) Prior Publication Data
US 2015/0000423 A1    Jan. 1, 2015

Related U.S. Application Data

(60) Provisional application No. 61/537,599, filed on Sep. 22, 2011.

(51) Int. Cl.
*G01F 1/84* (2006.01)
*F04B 43/09* (2006.01)
(Continued)

(52) U.S. Cl.
CPC ............. *F04B 43/09* (2013.01); *F04B 43/0072* (2013.01); *F04B 43/04* (2013.01); *G01F 1/383* (2013.01); *G01F 15/006* (2013.01); *G01L 13/021* (2013.01); *G01L 13/06* (2013.01)

(58) Field of Classification Search
None
See application file for complete search history.

(56) References Cited

U.S. PATENT DOCUMENTS

| 5,445,035 A | * | 8/1995 | Delajoud | ................. G01F 1/40 138/40 |
| 6,314,821 B1 | * | 11/2001 | Allan | ........................ G01F 1/44 73/861.52 |

(Continued)

FOREIGN PATENT DOCUMENTS

| EP | 1 748 190 A1 | 1/2007 |
| EP | 2090270 | 8/2009 |

(Continued)

OTHER PUBLICATIONS

International Search Report and Written Opinion for corresponding patent Application No. PCT/US2012/056793 dated Sep. 24, 2012.

(Continued)

*Primary Examiner* — Harshad R Patel
(74) *Attorney, Agent, or Firm* — Renner, Otto, Boisselle, Sklar LLP (57) ABSTRACT

One or more electroactive polymer (EAP) strips are circumferentially or lengthwise embedded or mounted around the fluid passage member. The EAP strips change electrical characteristics (e.g., capacitance, resistance) independent of an applied actuation as they are stretched, so they may be used to measure fluid pressure and/or fluid flow rate.

11 Claims, 8 Drawing Sheets

(51) Int. Cl.
*F04B 43/04* (2006.01)
*F04B 43/00* (2006.01)
*G01F 1/38* (2006.01)
*G01F 15/00* (2006.01)
*G01L 13/02* (2006.01)
*G01L 13/06* (2006.01)

(56) References Cited

U.S. PATENT DOCUMENTS

| | | | |
|---|---|---|---|
| 6,865,957 B1 * | 3/2005 | Hughes | G01F 1/40 |
| | | | 73/861.52 |
| 7,397,166 B1 | 7/2008 | Morgan et al. | |
| 7,657,392 B2 * | 2/2010 | Gysling | G01N 9/002 |
| | | | 702/128 |
| 8,365,609 B2 * | 2/2013 | Shimazu | G01B 7/18 |
| | | | 73/775 |
| 2004/0068220 A1 | 4/2004 | Couvillon, Jr. et al. | |
| 2005/0040733 A1 | 2/2005 | Goldenberg et al. | |
| 2007/0022824 A1 * | 2/2007 | Bailey | G01F 1/666 |
| | | | 73/861.17 |
| 2008/0276723 A1 * | 11/2008 | Gysling | G01F 1/34 |
| | | | 73/861.04 |

FOREIGN PATENT DOCUMENTS

WO 2006/121818 11/2006
WO 2009/132651 A1 11/2009

OTHER PUBLICATIONS

Partial International Search Report for corresponding International Application No. PCT/US2012/056793 Feb. 7, 2014.

* cited by examiner

PRESSURE SENSING APPARATUS INCLUDING A PLURALITY OF ELECTROACTIVE POLYMER STRIPS

RELATED APPLICATION DATA

This application is a national phase of International Application No. PCT/US2012/056793 filed Sep. 24, 2012 and published in the English language and claims priority to U.S. Provisional Patent Application No. 61/537,599 filed Sep. 22, 2011, which is incorporated herein by reference in its entirety.

TECHNICAL FIELD

The present invention relates to a fluid passage member having a plurality of electroactive polymer strips coupled to the fluid passage member, wherein the electroactive polymer strips are configured for pumping fluid through the fluid passage member and/or sensing fluid pressure flowing through the fluid passage member.

BACKGROUND

In order to obtain fluid flowing through a flowing passage member, an external fluid pump is generally needed. The pump is generally coupled to a source of fluid and forces the fluid out a prescribed rate through the fluid passage member. It is also common in fluid systems to desire knowledge of the pressure of the fluid flowing through the system for maintaining system operating parameters within an acceptable range, detecting malfunctioning of products due to an abrupt pressure change, etc. Currently, many fluidic and pneumatic systems do not incorporate any local fluid actuation system or pressure measurement capabilities.

SUMMARY

The present invention overcomes the above limitations by providing one or more electroactive polymer strips circumferentially embedded or mounted around the fluid passage member. The electroactive polymer (EAP) strips have two primary characteristics utilized within this invention. First, when an electrical charge (e.g., voltage or current) is applied and removed to the EAP strips, they will expand and constrict accordingly. A series of these strips may be mounted along a portion or all of the fluid passage member and electrically actuated in a prescribed manner to exert a squeezing force around the fluid passage member, which functions to pump fluid through the fluid passage member. Second, the EAP strips will also change electrical characteristics (e.g., capacitance, resistance) independent of the applied actuation as they are stretched. Therefore, the electrical charge output by the EAP strips may correlated to strain and/or fluid pressure contained within the fluid passage member. For example, the fluid passage member will expand circumferentially outward, hence causing the EAP strips that are bonded or embedded within the fluid passage member also to be stretched. As the circumference of the fluid passage member expands with pressure, the electrical output signal of the EAP strip will also vary and can be monitored and/or processed to determine status of the fluid passage member and/or rate of fluid passing through the fluid passage member, for example. This produces an effective method for measuring internal fluid pressure within a hose non-invasively.

Another aspect of the invention relates to having at least two EAP "sensing" strips separated by a known distance. Conventional fluid dynamics calculations may be used to measure fluid flow through the fluid passage member.

One aspect of the present invention relates to a self-pumping fluid passage member including: a fluid passage member having an outer surface, an inner surface, a fluid inlet port, and a fluid outlet port; a plurality of strain actuators, wherein each of the strain actuators is spaced apart and coupled circumferentially around at least a portion of the fluid passage member; a controller coupled to each of the plurality of strain actuators, wherein the controller is configured to selectively activate each of the strain actuators to force fluid through the portion of the fluid passage member.

Another aspect of the invention relates to a method for pumping fluid through a fluid passage member, the method including: receiving a fluid from a fluid source at a fluid inlet port of a fluid passage member, wherein the fluid passage includes an outer surface and an inner surface, and the fluid passage member includes a fluid outlet port in fluid communication with the fluid inlet port; and pumping fluid received at the fluid inlet port to the fluid outlet port by selectively activating a plurality of electroactive polymer strips to force fluid through the fluid passage member, wherein each of the electroactive polymer strips is spaced apart and coupled circumferentially around at least a portion of fluid passage member.

Another aspect of the present invention relates to a sensor for measuring fluid pressure in a fluid passage member, the sensor including: a fluid passage member; and a plurality of electroactive polymer strips spaced apart and circumferentially mounted across at least a portion of the fluid passage member, wherein each of the electroactive polymer strips output an output signal based on an amount of fluid pressure detected in the fluid passage member.

Another aspect of the present invention relates to a method for sensing fluid pressure in a fluid passage member, the method including: receiving a fluid from a fluid source at a fluid inlet port of a fluid passage member, wherein the fluid passage includes an outer surface and an inner surface, and the fluid passage member includes a fluid outlet port in fluid communication with the fluid inlet port; receiving one or more output signals from a plurality of electroactive polymer strips spaced apart and circumferentially mounted across at least a portion of the fluid passage member, wherein each of the electroactive polymer strips output an output signal based on an amount of fluid pressure detected in the fluid passage member at a location where the electroactive polymer strip is coupled to the fluid passage member; and processing the one or more output signals to determine a fluid pressure that corresponds to the fluid flowing through the fluid passage member.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Embodiments of this invention will now be described in further detail with reference to the accompanying drawings, in which.

DETAILED DESCRIPTION OF EMBODIMENTS

Aspects of the present invention relate to a fluid passage member having dual capabilities of self-pumping fluid through at least a portion of the fluid passage member and sensing fluid pressure and/or fluid flow rate in the fluid passage member. One aspect of the present invention eliminates the need for adding a separate pumping mechanism to a fluid transfer system. The fluid passage member (also referred to herein as a hose) is essentially acting as the pump. The fluid passage member will also have the ability to sense internal pressure eliminating the need to add a separate pressure sensor to the system. The pressure sensing also does not necessitate the need to intrude within the fluid path, which may be critical for applications involving fluid media that is highly susceptible to contamination or chemical reaction.

In one embodiment, the fluid passage member may be used as a standalone pressure sensor if the pumping is not needed. Two or more EAP strips can be located at a defined distance between each other to read multiple pressure points. This can be used to accurately monitor the fluid flow within the fluid passage member, which eliminates the need for a separate flow meter. The pumping/sensing fluid passage member can be used for both compressible and non-compressible fluids.

Figure 1A:
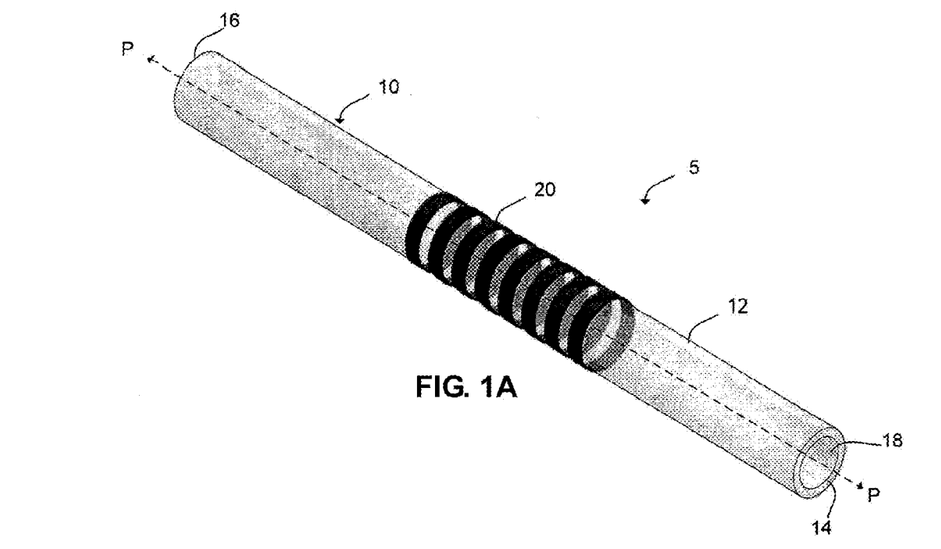
FIG. 1A is an exemplary system in accordance with aspects of the present invention.
Figure 1B:
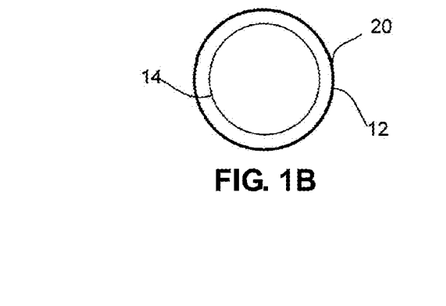
FIGS. 1B and 1C are exemplary cross-section areas of alternative embodiments of the present invention.
Figure 1C:
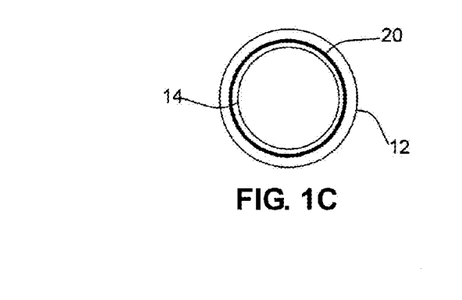

A self-pumping fluid passage member 5 in accordance with aspects of the present invention is illustrated in FIGS. 1A-1C. The self-pumping fluid passage member 5 includes a fluid passage member 10. The fluid passage member may be made from any desired type of material. In some embodiments, the selection of the material may be based on the application in which the self-pumping fluid passage member 5 may be used. For example, for medical applications, the fluid passage member may be made of medical grade materials. Preferably, the fluid passage member is made from a resilient material. Exemplary materials may include rubber, fluoropolymers (PFA, FEP, PVDF), engineering polymers, thermoplastic elastomers and polyolefins (LLDPE, HDPE, PP), etc.

The fluid passage member 10 includes an outer surface 12, an inner surface 14, a fluid inlet port 16, and a fluid outlet port 18. The fluid passage 10 may be any type of conduit that is suitable for fluid to pass from one end to another end. Exemplary types of fluids may be human fluids (e.g., blood, platelets, etc.), fluids for use in residential or commercial environments (e.g., water, oil, gas, etc.). The fluid passage member 10 may have any desired size and shape. The illustrated fluid passage member 10 is generally circular in cross-section.

The self-pumping fluid passage member 5 includes one or more strain sensors 20 mounted circumferentially around at least a portion of the outer surface 12 of the fluid passage member 10 as illustrated in FIGS. 1A and 1B. In another embodiment, the one or more strain sensors 20 are mounted between the inner surface 14 and the outer surface 12, as illustrated in FIG. 1C. The strain sensors 20 may be spaced apart a prescribed distance, which can be uniform or non-uniform.

As discussed below, the sensors 20 are operable for two modes of operation. The first mode is to detect a physical characteristic associated with the fluid passage member. The sensors 20 may also be selectively activated to act as an actuator in order to force fluid through the portion of the fluid passage member 10. For example, one or more the sensors may have an electrical charge applied to the sensors, which causes the sensor to elongate. The elongation acts to increase the volume of fluid in the fluid passage covered by the selected sensor. At the same time or at a different time other sensors 20 may be placed in a no electrical charge state, which causes the strain sensors 20 to return to their original position.

For purposes of this disclosure, the strain sensors 20 will be described as electroactive polymer (EAP) strips. However, other sensors may be used in accordance with aspects of the present invention. The EAP strips include a dielectric layer that separates a first electrode layer and a second electrode layer, also referred to herein as a pair of electrodes. When a voltage is applied to the electrode layers, the dielectric layer and the electrodes layers form a capacitor that varies in capacitance based on stress (e.g., stretching of the EAP material) applied to the dielectric layer causing the EAP material to strain in accordance to the material stress/strain curve. The output capacitance and/or resistance may be correlated to strain applied to the material. For example, the dielectric layer is configured to change thickness and surface area based on an amount of force and/or pressure applied to the dielectric layer, which changes the output capacitance of the capacitor formed by the dielectric layer and the electrode layers.

Thus, in one state, each of the EAP strips 20 may be actuated by applying an electrical charge to the EAP strip. The electrical charge applied to the EAP strips circumferentially mounted to at least a part of the fluid passage member 10 functions to increase volume within the inner surface covered by the EAP strip 20. A series of these EAP strips 20 wrapped around the fluid passage member and electrically actuated in a prescribed manner will exert a squeezing force around the fluid passage member 10, which functions to pump fluid through the fluid passage member. In a second state, the EAP strips 20 will also change electrical characteristics (e.g., capacitance, resistance) independent of the applied actuation (e.g., electrical charge) (capacitance, resistance) as they are stretched. Therefore, the electrical charge output by the EAP strips 20 may be correlated to strain and/or fluid pressure contained within the fluid passage member.

In one embodiment, it is desirable to circumferentially mount the EAP strips 20 circumferentially along at least a portion of the fluid passage member 10. The EAP strips 20 may be mounted using any desirable mounting mechanism. Suitable mounting mechanisms may include, for example, pressure sensitive adhesive, curable pressure sensitive adhesive, UV curable pressure sensitive adhesives, epoxies, cyanoacrylates, urethanes, acrylics, thermosetting adhesives, etc.

Preferably, the mounting mechanism is configured to securely couple the EAP strips 20 to the fluid passage member 10 in both a compressed stated and an expanded state. Depending on the type of strain sensor and/or application other mounting mechanisms may be used in accordance with aspects of the present invention.

Figure 2A:
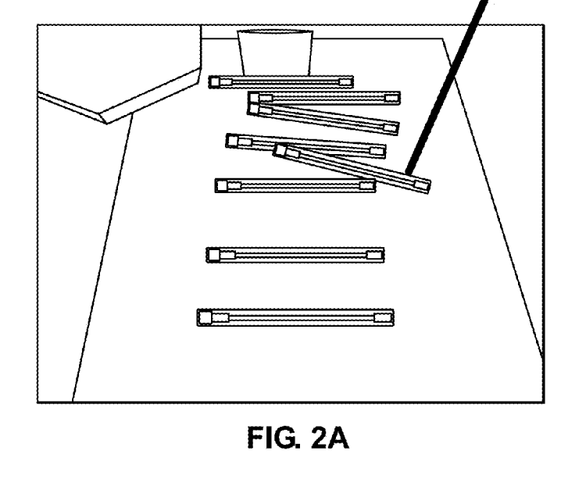
FIGS. 2A and 2B are exemplary electroactive polymer (EAP) strips in accordance with aspects of the present invention.
Figure 2B:
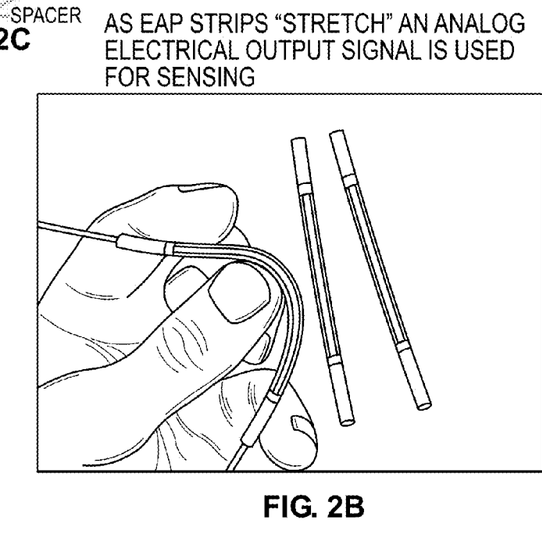
Figure 2C:
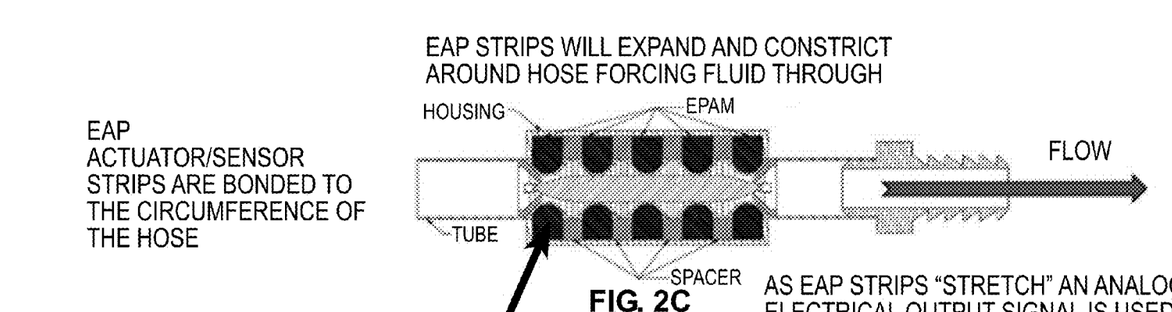
FIG. 2C is an exemplary cross-section area of a fluid passage member having an EAP strip illustrated in FIGS. 2A and 2B mounted.

Exemplary strain sensors 20 for use in accordance with aspects of the present invention are illustrated in FIGS. 2A-2F. Referring to FIGS. 2A-2C, exemplary EAP strips are illustrated. The EAP strips 20 are generally linear and are resilient such that when the EAP strips are bent, as illustrated in FIG. 2B, and the bending force is removed, the EAP strips restore to their original form. FIG. 2C illustrates the EAP strips 20 being circumferentially mounted on an exemplary fluid passage member.

The EAP strips 20 may take a variety of forms. For example, the EAP strips illustrated above may be bent around the circumference of the fluid passage member 10. Such EAP strips 20 may utilize an analog electrical output signal for sensing a physical characteristic of the fluid passage member by changing an electrical property (e.g., capacitance and/or resistance) of the sensor, which may be monitored or otherwise recorded, for example.

Figure 2D:
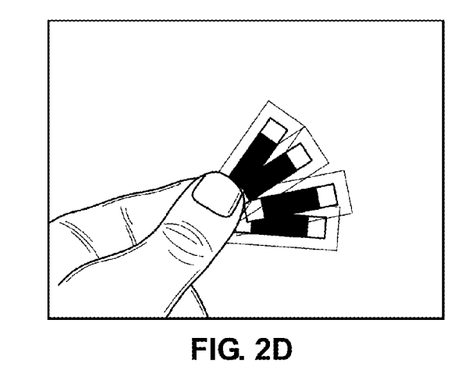
FIGS. 2D and 2E are another type of exemplary EAP strips in accordance with aspects of the present invention.
Figure 2E:
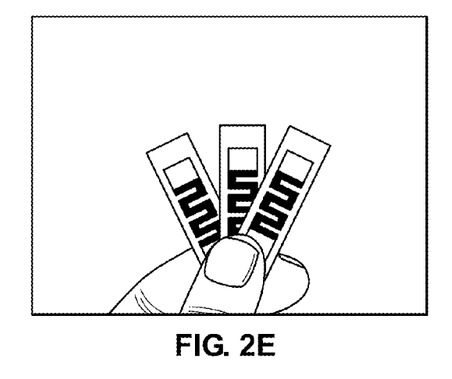
Figure 2F:
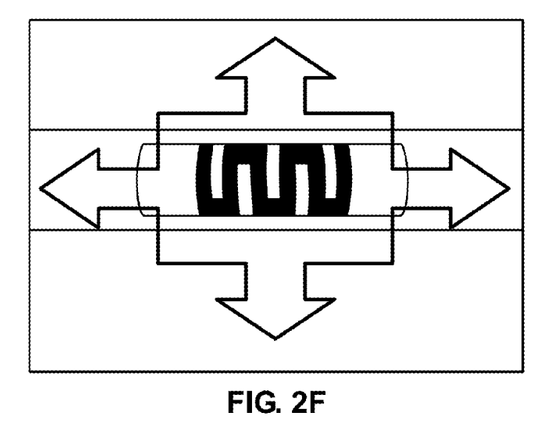
FIG. 2F is an exemplary cross-section area of a fluid passage member having an EAP strip illustrated in FIGS. 2D and 2E mounted.

In another embodiment illustrated in FIGS. 2D-2F, the EAP strips 20 are formed on a substrate. As illustrated in FIG. 2F, the EAP strips 20 may be secured to a portion of the fluid passage member 10 in a lengthwise manner and/or around a portion of the circumference of the fluid passage member. Preferably, the EAP strips 20 are not required to be mounted around the entire circumference of the fluid passage member 10. In this embodiment, the EAP strips are mounted lengthwise on only a portion of the fluid passage member (as opposed to completely around the fluid passage member as described above with respect to FIG. 2C).

A controller 30 is coupled to each of the plurality of EAP strips 20. The controller 30 is configured to selectively activate each of the EAP strips 20 to force fluid through a portion of the fluid passage member 10. A person having ordinary skill in the art will readily appreciate that the controller 30 may take a variety of forms including a computer, tablet, microprocessor, ASIC, etc.

Figure 3:
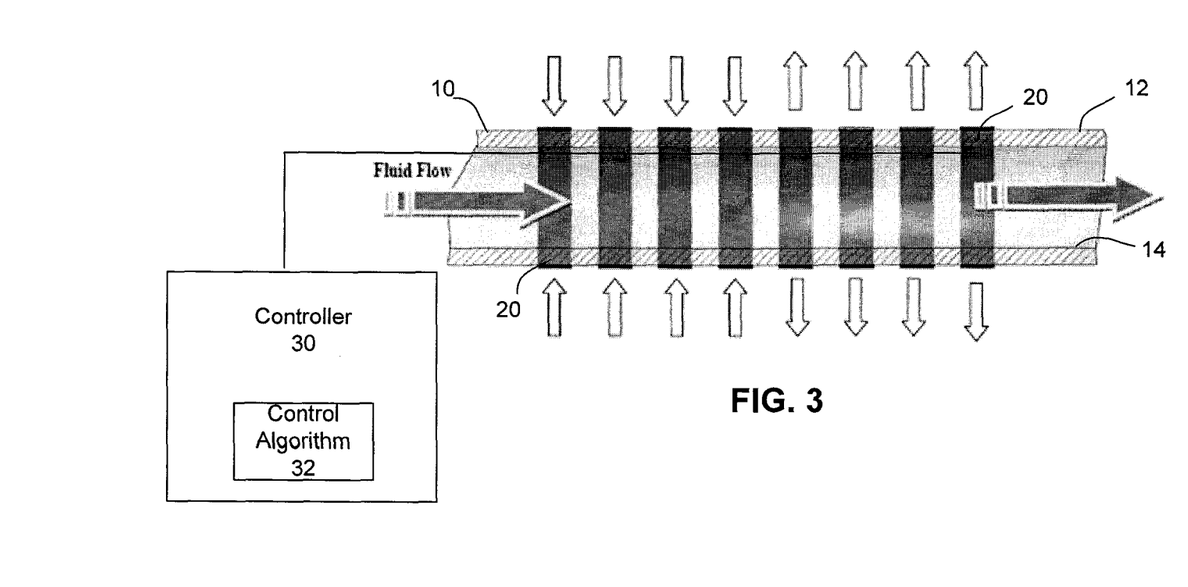
FIG. 3 is a cross-section view of a system in accordance with aspects of the present invention.

Referring to FIG. 3, the EAP strips 20 may be selectively controlled by a controller or other processor 30 to provide the self-pumping actuation of the EAP strips 20. When no electrical charge is supplied to the EAP strips, the EAP strips return to their original state (e.g., compressed state), which results in a reduced volume state in the fluid passage member. This is illustrated with the first four EAP strips having arrows pointed towards each other. In contrast, when an electrical charge is supplied to the EAP strips, the EAP strips expand circumferentially around the fluid passage member, which results in an increased volume state of the fluid passage member 10 the portion of the fluid passage member affected by the EAP strip actuation. This is shown schematically by the last four EAP strips 20 having arrows pointed away from each other.

The controller by itself or in conjunction with the control algorithm 32 may be configured to acutate each of the EAP strips to generate a flow of fluid through fluid passage member 10, as indicated by the fluid flow arrows. For example, the fluid passage member 10 will expand circumferentially outward (increase volume) when an electrical charge is supplied, hence causing the EAP strips that are bonded or embedded within the fluid passage member 10 also to be stretched. When the electrical charge is removed from the EAP strips 20 the EAP strips may compress back to reduced volume state, for example.

The controller 30 may implement a control algorithm 32 that the controller executes in order to obtain a desired flow rate of fluid through the fluid passage member and/or control activation of the EAP strips 20 to obtain any desired output through the fluid passage member 10.

In addition, the controller is also coupled to each of the EAP strips to monitor capacitance and/or resistance detected by the EAP strip in order to sense fluid pressure and/or fluid flow rate through the fluid passage member. This sensing function can be implemented when the EAP sensor has an electrical signal supplied or not. If an electrical signal is applied and held for a prescribed amount of time, the EAP sensor may be used to sense fluid pressure and/or fluid flow rate during the prescribed amount of time. This is possible due to the change electrical characteristics associated with having the EAP sensor in a fixed position (assuming a substantially constant electrical charge is applied to the EAP sensor).

Figure 4:
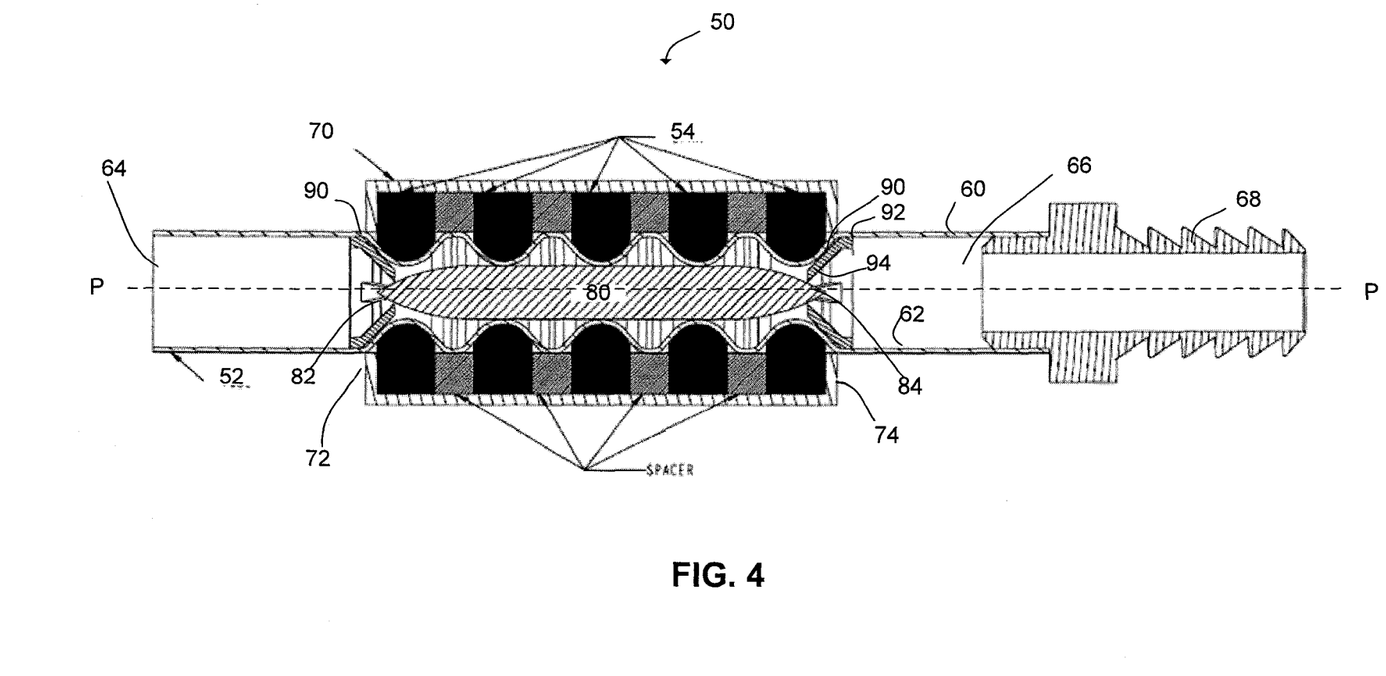
FIG. 4 is an exemplary system in accordance with aspects of the present invention.

FIG. 4 illustrates a cross-section of an exemplary self-pumping fluid passage member 50 in accordance with aspects of the present invention. As illustrated in FIG. 4, the self-pumping fluid passage member 50 includes a fluid passage member 52 having a plurality of strain sensors 54 (e.g., EAP strips) circumferentially mounted around the fluid passage member 52. The strain sensors are spaced apart a prescribed distance (d) by spacers (S). The spacers may be any desired size. Preferably, the spacer are made from the same material as the fluid passage member 52.

The fluid passage member 52 includes an outer surface 60, an inner surface 62, a fluid inlet port 64, and a fluid outlet port 66. These items are identical to components identified in prior figures. The fluid passage member 50 may be any type of conduit that is suitable for fluid to pass from one end to another end. The fluid passage member 52 may have any desired size and shape. As illustrated in FIG. 4, the output port 66 of the fluid passage member 52 may be coupled to a connector 68 (e.g., a quick connect coupler, a nozzle or other suitable connector) to facilitate connecting the fluid passage member 50 to another device or component, for example.

The strain sensors 54 are illustrated in FIG. 4 as being in a housing 70. The housing 70 includes a first end 72 and a second end 74 configured to have an end of the fluid passage member 52 inserted through the housing. The housing 70 may be configured to house the controller and the plurality of strain sensors 54. In addition or alternatively, the housing 70 is configured to house the plurality of strain sensors 54 and provide one or more ports for connecting other measuring and/or processing devices to the plurality of strain sensors 54.

The housing 70 may be secured to the fluid passage member in any desired manner. Preferably, the housing 70 is clamped around the sensing area (e.g., area of the fluid passage member containing the strain sensors 54) in order to isolate the strain sensors 54 from arbitrary twisting and bending movements a hose will be subjected to during normal use. This configuration protects normal hose movement, not related to internal pressure changes, from affecting measurement readings from strain sensors. For example, the portion of the fluid passage member between the ends 72, 74 are secured in a manner that prevents and/or substantially limits the ability of the fluid passage member from twisting and/or bending.

As illustrated in FIG. 4, the strain sensors 54 are configured to compress inner surface 62 of the fluid passage member 52. The compressed state of inner surface 62 effectively reduces the volume of the fluid passageway (P) at the location of the strain sensor. The strain sensors 54 are illustrated in a state where no electrical charge is applied to the strain sensors. In such a state, the fluid passageway (P) is in a reduced fluid flow state. When an electrical charge is applied to one or more of the strain sensors 54, the volume of the fluid passageway (P) that corresponds to the strain sensor 54 having a charge supplied increases, as discussed above. In this manner, the strain sensors 54 can be configured to pump fluid through the fluid passageway (P).

In some embodiments, it may be desired to further reduce the volume of the fluid passageway (P) in a portion of the fluid passage member having the strain sensors 52 mounted thereon. For example, compression of the EAP sensor alone may not be sufficient to control the fluid pressure and/or fluid rate. In one embodiment, the self-pumping fluid passage member 50 may include a lumen member 80. The lumen member 80 is configured to be inserted into the fluid passageway (P) in order to reduce the volume of fluid capable of flowing through the fluid passageway covered by the housing 70. Thus, the lumen member 80 is fluidly coupled in a fluid flow path of the fluid passage member 52 and the lumen member 80 is disposed within the inner surface 62 of the fluid passage member 52.

The lumen member 80 may be made of any desired material. Preferably, the material selected is compatible with the fluid in which the self-pumping fluid passage member is designed to pump. The lumen 80 may be any desired shape. As illustrated in FIG. 4, the lumen member 80 may be tapered on each the ends 82, 84 in order to facilitate fluid flowing into and out of the fluid passageway (P).

The lumen member 80 may be coupled to the inner surface 62 of the fluid passage member in any desired manner. In one embodiment at least one lumen support member 90 is frictionally mounted within the fluid passageway (P) against the inner surface 62. As illustrated in FIG. 4, the lumen support member 90 is frictionally coupled to inner surface 62 of the fluid passage member at both ends 82, 84. The lumen support member 90 may take a variety forms. For example, the lumen support member 90 may be generally tapered so as to have one flared end 92 that frictionally secures the lumen support member 90 within the fluid passageway (P). The lumen support member 90 may also have a second end 94 that is configured to receive an end of the lumen member 80, for example. The lumen support member 94 is configured not to restrict the flow of fluid through the fluid passageway (P).

Figure 5A:
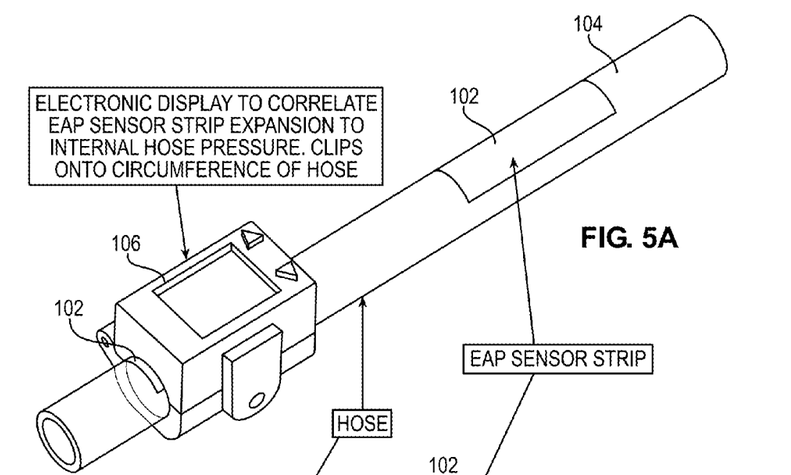
FIG. 5A is a perspective view of a system in accordance with aspects of the present invention.
Figure 5B:
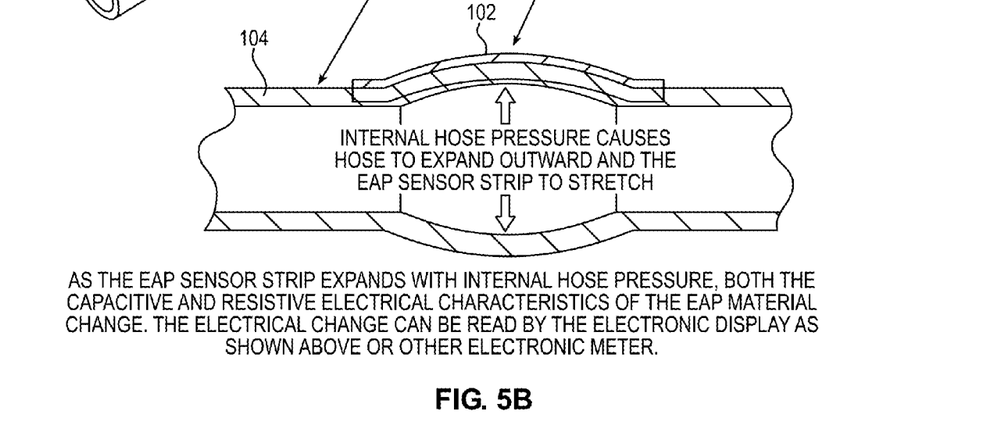
FIG. 5B is a cross-section of a fluid passage member in accordance with aspects of the present invention.

Referring to FIGS. 5A and 5B, an exemplary system 100 is illustrated. The exemplary system 100 includes a plurality of strain sensors 102 coupled to the fluid passage member 104. The system 100 further includes an electronic display 106, which may be secured over at least one of the plurality of strain sensors 102. As explained above, the output of the strain sensors changes due to expansion and contraction of the fluid passage member, which directly correlates to internal pressure of the fluid passageway, in which the one or more strain sensors are mounted.

Figure 6A:
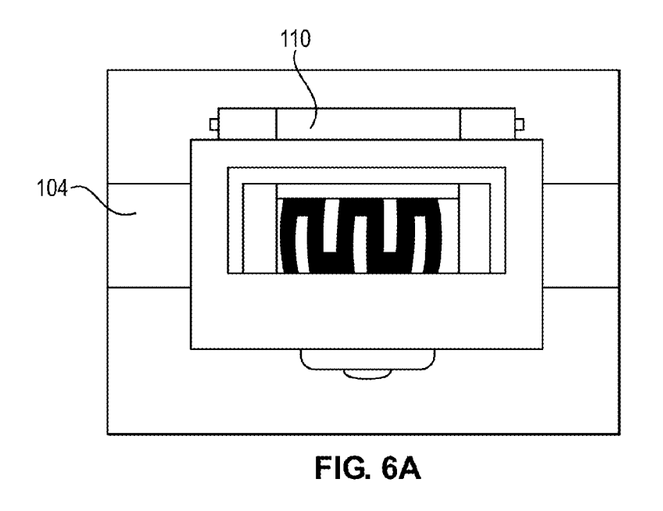
FIGS. 6A-6B illustrate applications of the EAP system in accordance with aspects of the present invention.
Figure 6B:
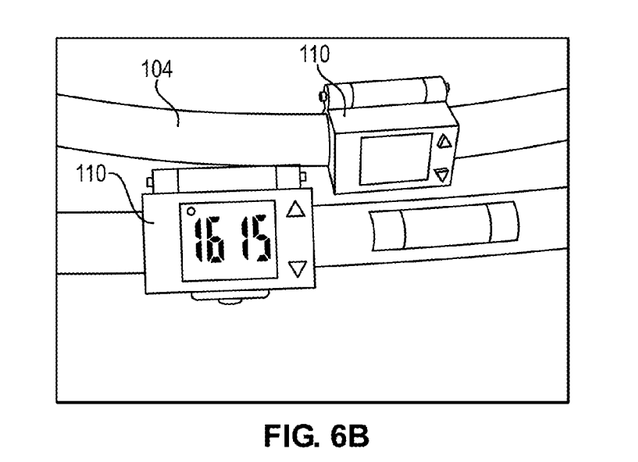

Referring to FIG. 5B, as the strain sensor 102 expands with internal hose pressure, both the capacitive and resistive electrical characteristics of the strain sensor (e.g., EAP strip) material change. The electronic display 106 is configured to output internal hose pressure and/or fluid rate to an associated user in a user friendly format in order to output such information the an associated user, for example. In other embodiments, the output of the one or more strain sensors 102 may be coupled to other devices for further processing and/or storage. FIGS. 6A and 6B illustrate other types of clip-on devices 110 that may used to monitor and/or protect one or more of the strain sensors 102 secured to the fluid passage member.

Figure 7:
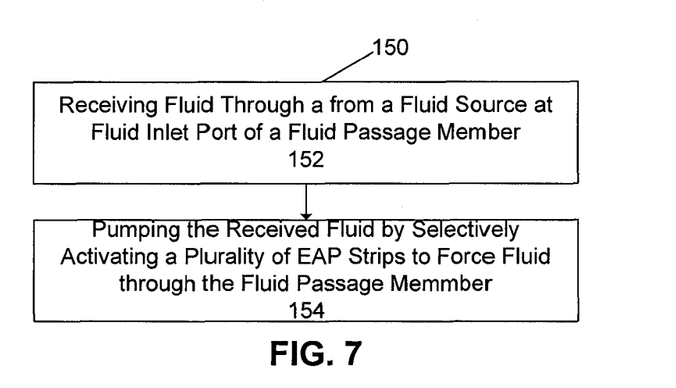
FIG. 7 is an exemplary method for pumping fluid through a fluid passage member in accordance with aspects of the present invention.

FIG. 7 is an exemplary method 150 for pumping fluid through a fluid passage member. At block 152, the method includes receiving a fluid from a fluid source at a fluid inlet port of a fluid passage member, wherein the fluid passage includes an outer surface and an inner surface, and the fluid passage member includes a fluid outlet port in fluid communication with the fluid inlet port.

At block 154, pumping the fluid received at the fluid inlet port to the fluid outlet port by selectively activating a plurality of electroactive polymer strips to force fluid through the fluid passage member. Each of the electroactive polymer strips is spaced apart and coupled circumferentially around at least a portion of fluid passage member. Each of the plurality of the electroactive polymer strips may be actuated in any desired manner. In one embodiment, the strips are sequentially actuated in a predefined manner to force fluid through the fluid passage member. In another embodiment, each of the plurality of electroactive polymer strips is operated in a coordinated manner (singularly, in groupings, or in any desired manner) to obtain a desired flow rate of fluid through the fluid passage member.

The method 150 may be performed with or without insertion of a lumen member 80 in a fluid flow path of the fluid passage member 52. If a lumen member is used it may be beneficial to position or otherwise dispose the lumen member 80 between the portion of the outer surface coupling the plurality of electroactive polymer strips. A person of ordinary skill in the art will appreciate that the lumen member 80 is configured to reduce a volume of fluid in the fluid passage member, but not restrict fluid flow. The lumen member 80 may be secured in the fluid passageway (P) with at least one lumen support member 90, as discussed above.

It will further be appreciated that the method 150 may be used when the plurality of electroactive polymer strips are coupled on the outer surface of the fluid passage member or embedded between the inner surface and the outer surface of the fluid passage member.

Figure 8:
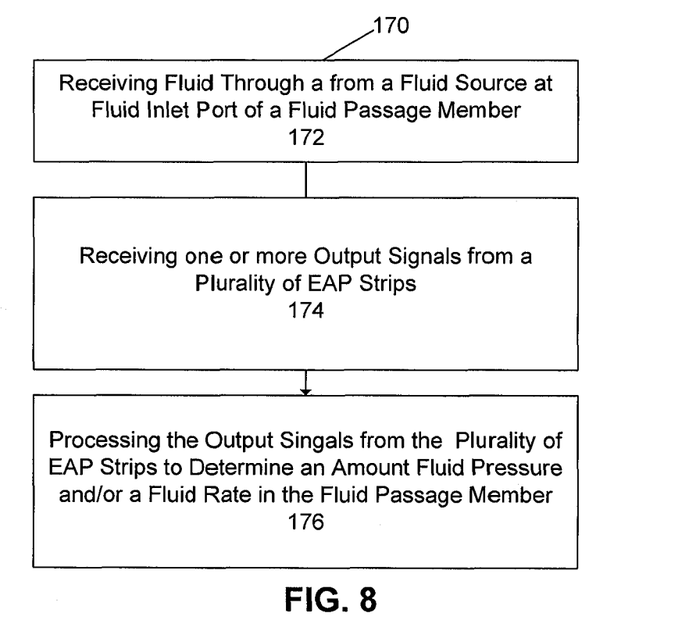
FIG. 8 is an exemplary method for sensing fluid pressure and/or fluid rate in a fluid passage member in accordance with aspects of the present invention.

FIG. 8 is an exemplary method 170 for sensing fluid pressure and/or fluid rate in a fluid passage member.

At block 172, the method includes receiving fluid from a fluid source at a fluid inlet port of a fluid passage member. The fluid passage includes an outer surface and an inner surface, and the fluid passage member includes a fluid outlet port in fluid communication with the fluid inlet port. As discussed above, each of the plurality of EAP strips have a first state with no electrical charge supplied to the EAP strip and a second state when an electrical charge is applied to the EAP strip, wherein the second state corresponds to an increased volume of the fluid passageway caused by expansion of the EAP strip on the fluid passage member.

At block 174, the method includes receiving one or more output signals from a plurality of electroactive polymer strips spaced apart and circumferentially mounted across at least a portion of the fluid passage member. Each of the electroactive polymer strips output an output signal based on an amount of fluid pressure and/or fluid flow rate detected in the fluid passage member at a location in which the electroactive polymer strip are coupled to the fluid passage member. In each of the first (no electrical charge applied to the EAP strip) and second state (an electrical charge applied to the EAP strip), each of the plurality of electroactive polymer strips is configured to measure fluid pressure and/or fluid flow rate through the fluid passage member.

At block 176, the one or more output signals of the EAP strips are processed to determine a fluid pressure and/or flow rate that corresponds to the fluid flowing through the fluid passage member.

The method 170 may be performed with or without insertion of a lumen member 80 in a fluid flow path of the fluid passage member 52. If a lumen member 80 is used it may be beneficial to position or otherwise dispose the lumen member 80 between the portion of the outer surface coupling the plurality of EAP strips. A person of ordinary skill in the art will appreciate that the lumen member 80 is configured to reduce a volume of fluid in the fluid passage member, but not restrict fluid flow. The lumen member 80 may be secured in the fluid passageway (P) with at least one lumen support member 90, as discussed above.

It will further be appreciated that the method 170 may be used when the plurality of electroactive polymer strips are coupled on the outer surface of the fluid passage member or embedded between the inner surface and the outer surface of the fluid passage member.

There a variety of benefits associated with the present invention. For example, i) eliminating the need for adding a separate pumping mechanism for a fluid transfer system. The hose is essentially acting as the pump; ii) the hose will also have the ability to sense internal pressure eliminating the need to add a separate pressure sensor to the system. The pressure sensing also does not necessitate the need to intrude within the fluid path. This is critical for fluid media that is highly susceptible to contamination or chemical reaction; iii) the hose can be used as a standalone pressure sensor if the pumping is not needed; iv) two or more EAP strips can be located at a defined distance between each other to read multiple pressure points. This can be used to accurately monitor the fluid flow within the hose eliminating the need for a separate flow meter; and v) the pumping/sensing hose can be used for both compressible and non-compressible fluids.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

What is claimed is:

1. A sensor for measuring fluid pressure in a fluid passage member, the sensor comprising:
   a fluid passage member;
   a plurality of electroactive polymer strips spaced apart and circumferentially mounted across at least a portion of the fluid passage member, wherein each of the electroactive polymer strips output an output signal based on an amount of fluid pressure detected in the fluid passage member, and
   a controller coupled to the plurality of electroactive polymer strips, wherein the controller is configured to selectively supply a substantially constant electric charge to one or more of the plurality of electroactive polymer strips for a prescribed period of time to provide a pumping action and the controller is further configured to measure an output signal of the selected electroactive polymer strip to determine an output pressure due to deformation in the fluid passage member over at least a portion of the prescribed time.

2. The sensor of claim 1, wherein the controller is configured to process the output signal to determine at least one physical characteristic associated with the fluid passage member.

3. The sensor of claim 1 further including one or more spacer members (S) coupled between adjacent electroactive polymer strips.

4. The sensor of claim 3, wherein the plurality of electroactive polymer strips are separated a known distance.

5. The sensor of claim 1, wherein the controller is configured to determine a fluid flow rate through the fluid passage member.

6. The sensor of claim 1 further including a lumen member fluidly coupled in a fluid flow path of the fluid passage member and the lumen member is disposed between a portion of an outer surface of the fluid passage member coupling the plurality of sensors, wherein the lumen member is configured to narrow a distance between the inner surface of the fluid passage member.

7. The sensor of claim 1 further including a housing, configured to house the plurality of electroactive polymer strips and the housing is configured to isolate the electroactive polymer strips from twisting and bending movement of the fluid passage member during normal use of the sensor that is not related to internal pressure changes of the fluid passage member.

8. A method for sensing fluid pressure in a fluid passage member, the method comprising: receiving a fluid from a fluid source at a fluid inlet port of a fluid passage member, wherein the fluid passage member includes an outer surface and an inner surface, and the fluid passage member includes a fluid outlet port in fluid communication with the fluid inlet port;
   selectively supplying a substantially constant electric charge to at least one of a plurality of electroactive polymer strips for a prescribed period of time to provide a pumping action, the plurality of electroactive polymer strips spaced apart and circumferentially mounted across at least a portion of the fluid passage member,
   receiving one or more output signals from the plurality of electroactive polymer strips, wherein each of the electroactive polymer strips output an output signal based on an amount of fluid pressure detected in the fluid passage member due to deformation in the fluid passage member at a location where the electroactive polymer strip is coupled to the fluid passage member; and
   processing the one or more output signals to determine a fluid pressure that corresponds to the fluid flowing through the fluid passage member.

9. The method of claim 8, wherein each of the plurality of electroactive polymer strips has a first state with no electrical charge supplied to the electroactive polymer strip and a second state when an electrical charge is applied to the electroactive polymer strip.

10. The method of claim 9, wherein each of the plurality of electroactive polymer strips is configured to measure fluid pressure in the first state and the second state.

11. The method of claim 8 further including inserting a lumen member in a fluid flow path of the fluid passage member and the lumen member is disposed between a portion of an outer surface of the fluid passage member coupling the plurality of electroactive polymer strips, wherein the lumen member is configured to narrow a distance between the inner surface of the fluid passage member.

* * * * *